United States Patent [19]

Scragg et al.

[11] 4,426,354
[45] Jan. 17, 1984

[54] POWER GENERATOR SYSTEM FOR HCL REACTION

[75] Inventors: Robert L. Scragg; Alfred B. Parker, both of Miami, Fla.

[73] Assignee: Solar Reactor Corporation, Miami, Fla.

[21] Appl. No.: 901,796

[22] Filed: May 1, 1978

[51] Int. Cl.³ .............................................. G21D 7/04
[52] U.S. Cl. .................................. 376/320; 376/323
[58] Field of Search .......................... 176/39; 6/87; 204/157.1 H; 60/641; 376/320, 323

[56] References Cited

U.S. PATENT DOCUMENTS

| | | | |
|---|---|---|---|
| 3,228,848 | 1/1966 | Fellows | 176/39 |
| 3,764,660 | 10/1973 | Krikorian | 176/39 X |
| 3,772,172 | 11/1973 | Zhagatspanian et al. | 204/157.1 H |
| 3,998,205 | 12/1971 | Scragg et al. | 60/641 X |
| 4,097,348 | 6/1978 | Gomberg | 240/157.1 H |
| 4,140,603 | 2/1979 | Gomberg | 240/157.1 H |

OTHER PUBLICATIONS

Allen, *Chemical Effects of Ionizing Radiation on Simple Inorganic Compounds & Aqueous Solutions*, Tech. Inf. Div., Oak Ridge Operations.

*Primary Examiner*—Peter A. Nelson
*Attorney, Agent, or Firm*—Cushman, Darby and Cushman

[57] ABSTRACT

A power generation system includes a nuclear reactor having a core which in addition to generating heat generates a high frequency electromagnetic radiation. An electromagnetic radiation chamber is positioned to receive at least a portion of the radiation generated by the reactor core. Hydrogen and chlorine are connected into the electromagnetic reactor chamber and react with controlled explosive violence when exposed to the radiation from the nuclear reactor. Oxygen is fed into the reactor chamber as a control medium. The resulting gases under high pressure and temperature are utilized to drive a gas turbine generators.

In an alternative embodiment the highly ionized gases, hydogen and chlorine are utilized as a fluid medium for use in magnetohydrodynamic generators which are attached to the electromagnetic reactor chambers.

10 Claims, 4 Drawing Figures

POWER GENERATOR SYSTEM FOR HCL REACTION

BACKGROUND OF THE INVENTION

This application is related to copending U.S. patent application Ser. No. 857,895 filed Dec. 6, 1977, which in turn is a continuation-in-part of U.S. patent application Ser. No. 692,495 now U.S. Pat. No. 4,070,861, which in turn is a continuation-in-part of U.S. patent application Ser. No. 657,383 now U.S. Pat. No. 4,026,112, which in turn is a continuation-in-part of U.S. patent application Ser. No. 588,888 now U.S. Pat. No. 4,024,715, which in turn is a continuation-in-part of U.S. patent application Ser. No. 564,087 now U.S. Pat. No. 3,998,205.

This invention relates to a system for converting electromagnetic energy to mechanical energy.

As disclosed in the aforementioned U.S. patents, it is known to convey controlled amounts of hydrogen and chlorine to a chamber which is exposed to high frequency electromagnetic radiation such as derived from the sun or from an artificial light source. The chlorine molecules are broken up into atomic chlorine with some chlorine being ionized. The atomized chlorine combines with hydrogen atoms to form hydrogen chloride. The hydrogen chloride is formed in an exothermic reaction which results in the temperature of the hydrogen chloride being substantially higher than that of the chlorine or hydrogen molecules conveyed to the reactor chamber. The resulting high temperature, high pressure gas is utilized to drive an output device such as a turbine.

Such a system requires a substantial amount of high energy electromagnetic radiation. This is not available from the sun unless a concentrator is utilized. Further, even with a concentrator, the sunlight is not continuously available and the level of sunlight changes with the seasons and with the weather.

Thus there is a need in the art to provide an improved source of high energy electromagnetic radiation.

It is also known in the art to provide a nuclear reactor for converting nuclear into mechanical or electrical energy. A number of different types of reactors are available, however, all reactors generate high frequency radiation including gamma rays. This radiation which is harmful to humans is dissipated through a shield. This energy is thus lost during the nuclear power generation process.

There, accordingly, is a need in the art to provide an improved means for utilizing the high energy radiation generated in nuclear reactors.

SHORT STATEMENT OF THE INVENTION

Accordingly, this invention relates to an energy conversion system which includes an electromagnetic reactor chamber having inputs for controllably coupling chlorine and hydrogen thereto. The chamber is positioned with respect to a nuclear reactor such that high energy radiation from the reactor is conveyed from the nuclear reactor to the electromagnetic reactor chamber. The radiation from the nuclear reactor is, therefore, utilized to convert the hydrogen and chlorine to hydrogen chloride and other highly charged particles at high temperature and pressure levels. Thus a continuous source of high energy radiation is provided while at the same time a means is provided for eliminating the danger of harmful radiation leaking from the nuclear reactor.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE PREFERRED EMBODIMENT

Figure 1:
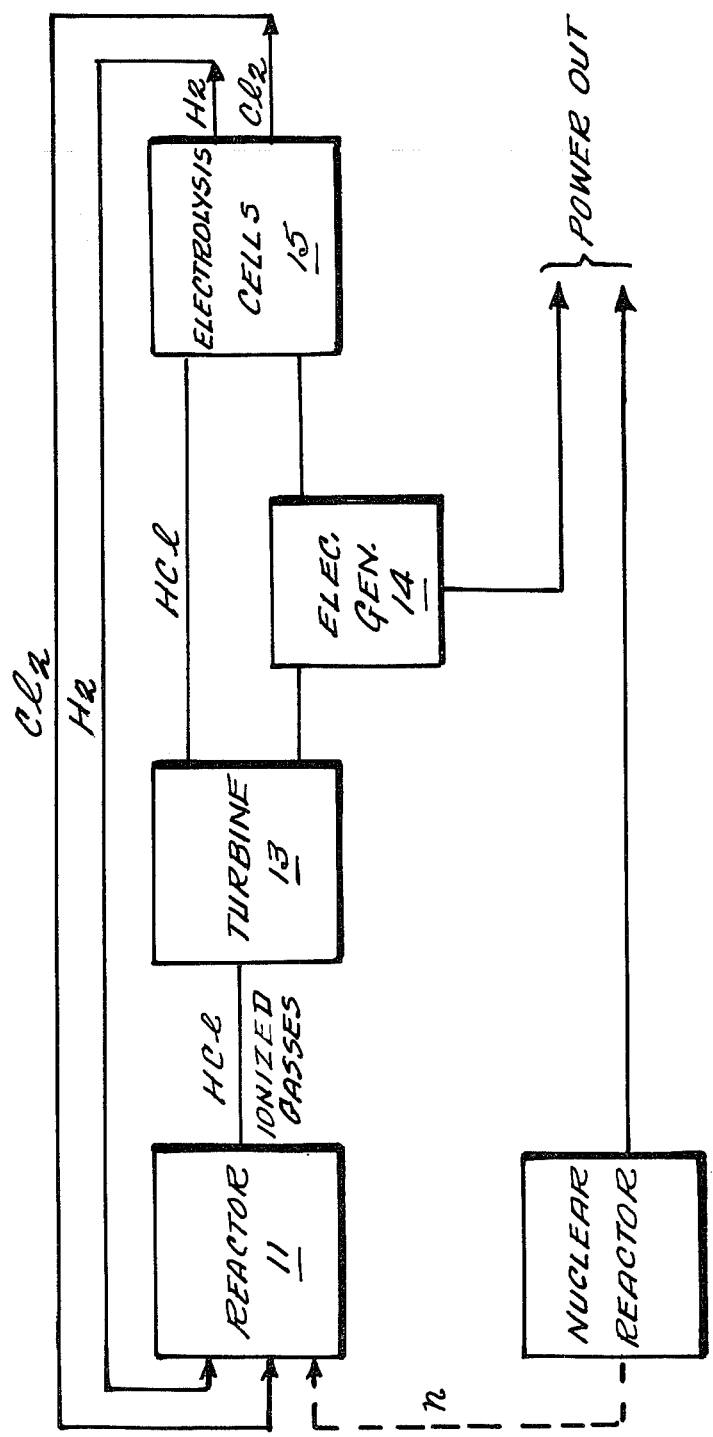
FIG. 1 is a schematic block diagram of the preferred embodiment of the present invention.

Refer now to FIG. 1 which is a simplified schematic illustration of the preferred embodiment of the present invention. An electromagnetic reactor chamber 11 of the type illustrated and described in U.S. Pat. Nos. 4,070,861; 4,026,112; 4,024,715 and 3,998,205 each of which are assigned to the common assignee herewith, is shown having its output connected to a turbine 13. As will be explained more fully hereinbelow the reactor generates high temperature, high pressure hydrogen chloride and highly ionized hydrogen and chlorine. These gases are coupled to a turbine 13 which is designed to withstand the highly corrosive hydrogen chloride and which converts the high energy molecules and particles from reactor 11 to mechanical energy. The output of the turbine drives a suitable power output device such as an electrical generator 14. The gases from the turbine which include hydrogen chloride are coupled to an electroylsis cell 15 which through a process of electrolysis commonly known in the art generates molecular hydrogen and chlorine. The molecular hydrogen and chlorine are controllably coupled back to the reactor 11 to form the reactants therein.

As an important part of the present invention, a nuclear reactor 17 of conventional design has a nuclear reactor core therein, together with nuclear fuel rods, moderator rods and control rod piles, each of which are contained in a pressure vessel. The pressure vessel has at least one sight glass in the vessel wall in close proximity to the reactor 11. The nuclear reactor produces thermal and radiant energy as nuclear transition and degradation occurs within the reactor 17. Gamma rays from the reactor are directed into the reactor chamber 11 and absorbed by the chlorine and hydrogen molecules in the presence of oxygen. The resulting highly energized gases generate light, heat and pressure in the reactor 11. The high pressure gases in turn drive the turbine 13. The gases and gamma radiation are quantitatively controlled to bring about the desired reaction between the reactants for the purpose of obtaining the desired energy levels for the turbine 13.

The thermal energy from the nuclear reactor 17 may be utilized to drive the same power output device as driven by the reactor 11 or may be used for any other suitable purpose.

Figure 2:
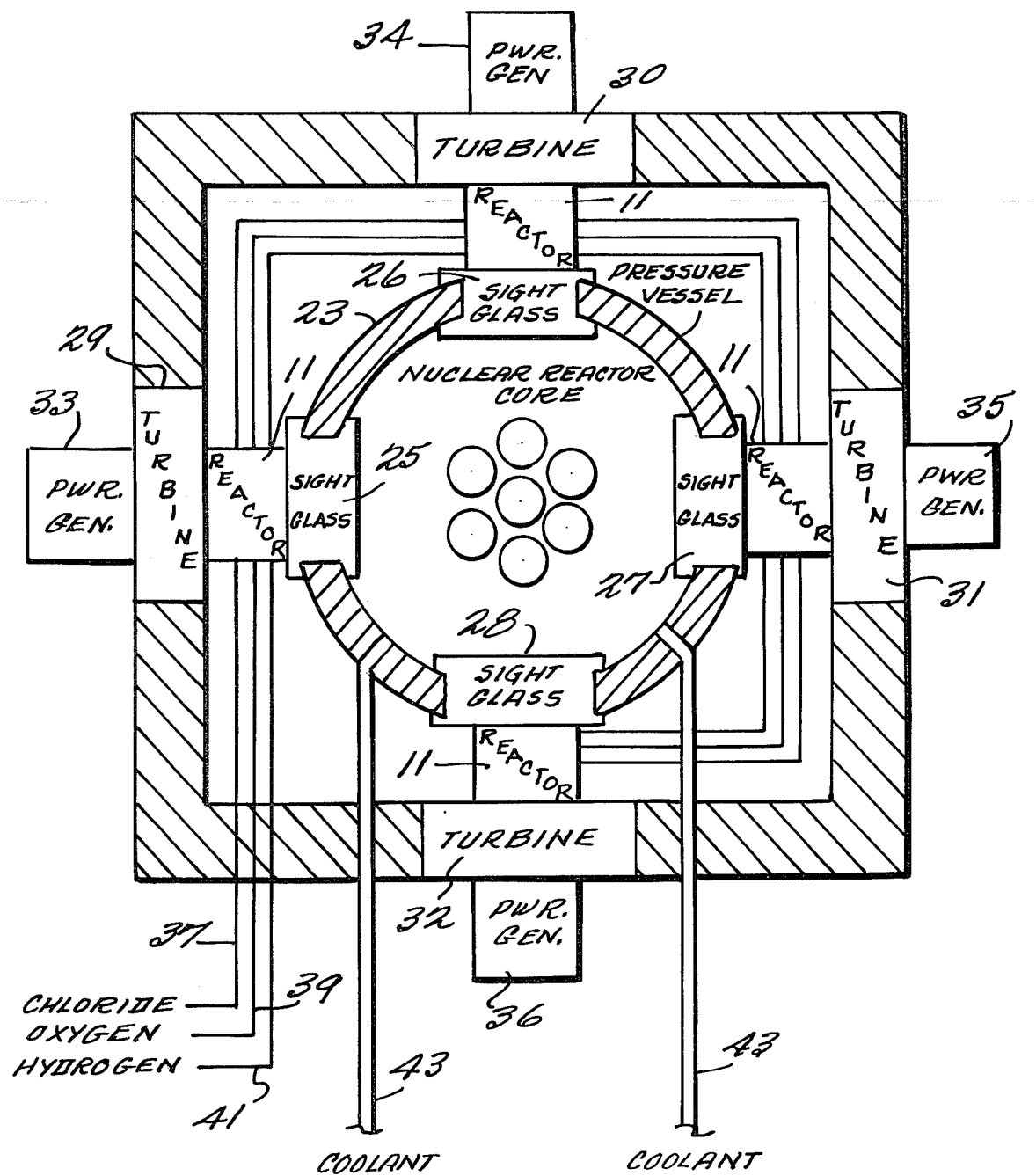
FIG. 2 is a simplified section view of the preferred embodiment of the present invention.

Refer now to FIG. 2 which is a simplified section view of the referred embodiment of the present invention.

As illustrated in FIG. 2, a nuclear reactor power system is illustrated in simplified plan view and includes reactor housing 21 which is formed of reinforced concrete or other materials capable of retaining high frequency radiation. The housing 21 contains a nuclear reactor core which is positioned within a pressure vessel 23. The pressure vessel has, in the preferred embodiment, a plurality of sight glasses 25-28 which are supported and fixed in the pressure vessel at appropriate intervals about the wall. The sight glasses must be strong enough to support the pressure generated by the nuclear reactor core while at the same time be transparent to the high frequency electromagnetic radiation generated therein.

A plurality of electromagnetic reactor chambers 11 are each positioned proximate a sight glass for receiving the high frequency electromagnetic radiation generated in the core. The electromagnetic reactor chambers, as aforementioned, are of the type disclosed in the aforementioned U.S. patents, the subject matter of which is incorporated herein by reference thereto. The reactor chambers are each secured to a corresponding sight glass by suitable mechanical means to render the chambers pressure tight at the junction of the sight glass and the reactor. Secured to the other end of the reactors are turbines 29-32. Preferably the turbines 29-32 are secured to and supported by the nuclear reactor housing 21 turbines as illustrated. The turbines may be of any suitable degree known in the art. However, the turbine must be capable of withstanding the corrosive effects of hydrogen chloride and highly ionized gases. The turbines are each connected directly to an electric power generator 33-36. The output of the power generators can be utilized for any suitable purpose.

A chlorine conduit 37, an oxygen conduit 39 and a hydrogen conduit 41 are coupled to each of the reactor chambers with the hydrogen and chlorine providing the reactants in the electromagnetic reactor chambers and the oxygen being utilized as a control medium. In addition, as is known in the art, coolant conductors 43 are coupled to the nuclear reactor core to carry away therefrom the heat energy generated in the core.

In operation, in the preferred embodiment, a coolant is circulated through the pipes 43 for the purpose of removing heat from the reactor core with the heat from the core being utilized to generate steam directly or via a suitable heat exchanger for the purpose of providing a means for driving steam turbine generators. In addition, the nuclear reactor produces thermal and electromagnetic energy during the nuclear transition and degradation within the core. As nuclear transformation and degradation occur, gamma radiation is reduced and alpha radiation increased. At least in part of this electromagnetic radiation is conducted through the sight glasses into each of the electromagnetic reactor chambers. At the same time hydrogen and chlorine gas are controllably fed into the reactor chambers together with oxygen. The high energy electromagnetic radiation is absorbed by the chlorine and hydrogen molecules in the presence of the oxygen. The resulting highly energized gases form hydrogen chloride as well as highly ionized chlorine and hydrogen. These highly energized gases generate heat and pressure in each of the reactors which energy is utilized to drive the respective turbines. By controlling the input of hydrogen and chlorine as well as oxygen or by controlling the amount of high energy radiation coupled to the reactor chamber, the desired energy levels can be achieved for driving the respective turbines.

Figure 3:
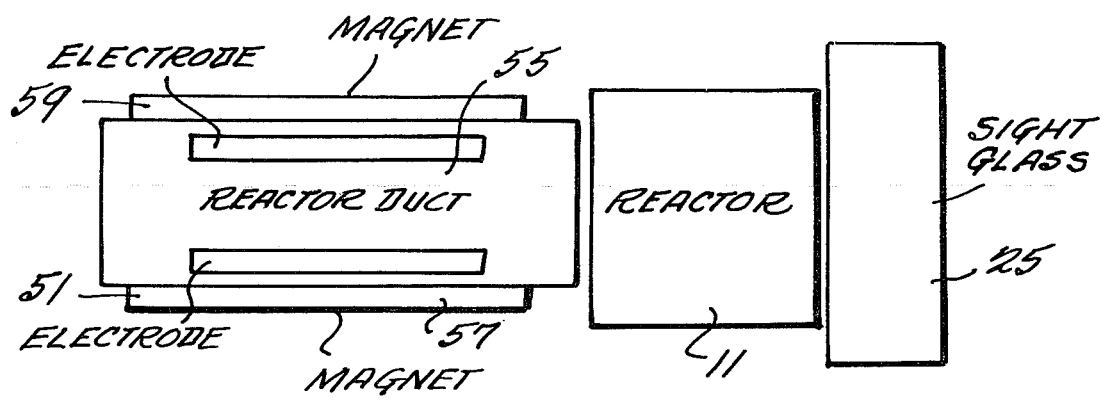
FIG. 3 is a simplified schematic block diagram of the power generation system of the present invention wherein the output of the reactor drives a magnetohydrodynamic generator.
Figure 4:
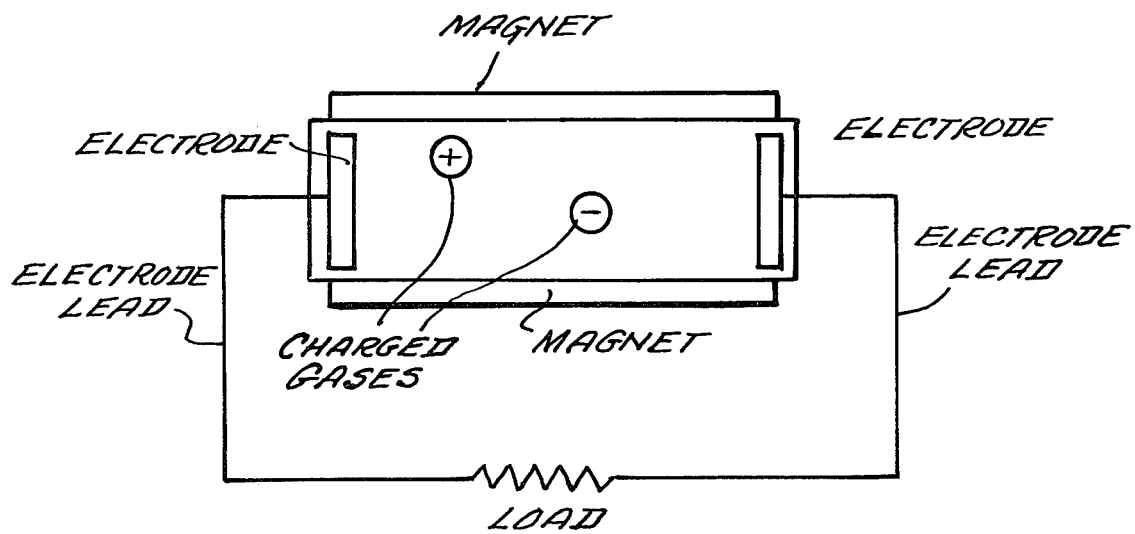
FIG. 4 is a simplified schematic diagram of a magnetohydrodynamic generator.

Refer now to FIGS. 3 and 4 which are simplified schematic block diagrams of the power generation system of the present invention wherein the output of the electromagnetic reactor drives a magnetohydrodynamic generator. In this embodiment of the invention of the chlorine and hydrogen gases in the electromagnetic reactor chamber are highly ionized and the resulting charged particles are utilized as a medium for the magnetohydrodynamic (MHD) generators 51 that may be positioned in place of the gas turbines of FIG. 2, or in the alternative may be positioned at the output of the gas turbines to receive whatever ionized gases are passed through the turbine. As is known in the art the ionized hydrogen and chlorine atoms resulting from the absorption of gamma and alpha radiation by the chlorine and hydrogen are expanded into a reactor duct 55 which is in the middle of a magnetic field produced by electromagnets 57 and 59. Electrodes 61 and 63 positioned inside and insulated from the wall of the reactor duct 55 receive the charged particles as they are deflected to the respective electrodes by the electromagnetic field generated by the magnets. Thus a positive potential is generated at one electrode and a negative potential at the other electrode thereby causing the generation of current. The output from the reactor duct may then be utilized by coupling the gases to a suitable storage or conversion units for converting the gases to molecular hydrogen chloride for feeding back to the reactor chamber in the manner described in connection with FIG. 1.

It should be understood by those skilled in the art that while a preferred embodiment has been disclosed in connection with the present invention there may be other embodiments which fall within the spirit and scope of the invention as defined by the appended claims.

We claim:

1. A energy generation system comprising
a reactor chamber,
means for controllably coupling chlorine and hydrogen to said reactor chamber,
a nuclear reactor core,
a housing for said nuclear reactor core, said housing being capable of withstanding the pressure generated inside thereof, said nuclear reactor core generating high frequency electromagnetic radiation,
means for directing at least a portion of said electromagnetic radiation into said reactor chamber, to thereby exothermically react said hydrogen and chlorine to generate highly charged particles and hydrogen chloride, said highly charged particles and hydrogen chloride having a high temperature, and
means for converting at least some of the energy of said generated hydrogen chloride and highly charged particles to mechanical energy.

2. An energy conversion system comprising
an electromagnetic reactor chamber,
means for controllably coupling chlorine and hydrogen to said reactor chamber,
a nuclear reactor, said nuclear reactor including a core for generating high frequency electromagnetic radiation and a pressure vessel, said nuclear reactor core being positioned inside of said pressure vessel, means for directing at least a portion of said high frequency electromagnetic radiation generated by said nuclear reactor core into said electromagnetic reactor chamber, said electromagnetic radiation being absorbed by said hydrogen and chlorine to thereby generate high energy hydrogen chloride, highly ionized hydrogen and chlorine means for controlling the rate of generation of said hydrogen chloride, ionized hydrogen and chlorine, and means for converting the energy of said hydrogen chloride, ionized hydrogen and chlorine to mechanical energy.

3. An energy conversion system comprising
an electromagnetic reactor chamber,
means for controllably coupling chlorine, hydrogen and oxygen to said reactor chamber,
a nuclear reactor, said nuclear reactor including a core for generating high frequency electromagnetic radiation and a pressure vessel, said nuclear reactor core being positioned inside of said pressure vessel
means for directing at least a portion of said high frequency electromagnetic radiation generated by said nuclear reactor core into said electromagnetic reactor chamber, said electromagnetic radiation being absorbed by said hydrogen and chlorine to thereby generate high energy hydrogen chloride, said hydrogen chloride having a high temperature, and
means for converting the energy of said high temperature hydrogen chloride to mechanical energy.

4. An energy conversion system comprising
an electromagnetic reactor chamber,
means for controllably coupling chlorine and hydrogen to said reactor chamber,
a nuclear reactor, said nuclear reactor including a core for generating high frequency electromagnetic radiation and a pressure vessel, said nuclear reactor core being positioned inside said pressure vessel,
means for directing at least a portion of said high frequency electromagnetic radiation generated by said nuclear reactor core into said electromagnetic reactor chamber, said electromagnetic radiation being absorbed by said hydrogen and chlorine to thereby generate high frequency hydrogen chloride, highly ionized hydrogen and chlorine,
means for converting the energy of said highly ionized hydrogen and chlorine to electrical energy.

5. The energy conversion system of claim 4, wherein said means for converting the energy of said highly ionized hydrogen and chlorine to electrical energy comprises a magnetohydrodynamic generator, and
means for conducting said highly ionized hydrogen and chlorine into said generator, said generator generating an electrical current.

6. The energy conversion system of claim 5, wherein said magnetohydrodynamic generator includes means for generating an electromagnetic field, a reactor duct, said electromagnetic field passing through said reactor duct, said means for conducting said ionized hydrogen and chlorine to said reactor duct and a pair of electrodes in said reactor duct for receiving the charge of said ionized hydrogen and chlorine when deflected by said electromagnetic field.

7. A power generation system comprising
a reactor chamber,
means for controllably coupling chlorine hydrogen and oxygen to said reactor chamber,
a nuclear reactor core,
a housing for said nuclear reactor core, said housing being capable of withstanding the pressure generated inside thereof, said nuclear reactor core generating high frequency electromagnetic radiation,
means for directing at least a portion of said electromagnetic radiation into said reactor chamber, to thereby exothermically react said hydrogen and chlorine to generate highly charged particles and hydrogen chloride, said highly charged particles and hydrogen chloride having a high temperature,
a turbine,
means for coupling said hydrogen chloride and highly charged particles to said turbine.

8. The power generation system of claim 7, further comprising means for converting said hydrogen chloride to molecular hydrogen and chlorine, and
means for coupling said hydrogen and chlorine to said means for controllably coupling chlorine and hydrogen to said reactor chamber.

9. The power generation system of claim 8, further comprising means connected to said turbine for converting said highly charged particles to an electric current.

10. The power generation system of claim 1, wherein said means for converting the energy of said highly charged particles and hydrogen chloride to mechanical power is connected to the output of said nuclear reactor.

* * * * *